Nov. 17, 1970   J. HOGAN ET AL   3,541,325
SUSPENSION GEAR FOR LANTERNS
Filed June 3, 1968   5 Sheets-Sheet 5

Inventors
JOHN HOGAN
ERIC B. RHEAD
By Young & Thompson
Attorneys

United States Patent Office  3,541,325
Patented Nov. 17, 1970

3,541,325
SUSPENSION GEAR FOR LANTERNS
John Hogan and Eric B. Rhead, Glasgow, Scotland, assignors to London Electric Firm Limited, Glasgow, Scotland
Filed June 3, 1968, Ser. No. 733,862
Claims priority, application Great Britain, Mar. 27, 1968, 14,832/68
Int. Cl. F21v 21/36
U.S. Cl. 240—65         1 Claim

ABSTRACT OF THE DISCLOSURE

Suspension gear for heavy lanterns for electric lamps which are mounted at a considerable height above ground level on a standard. The gear comprises a mounting on the standard, a lantern carrier releasably locked to the mounting and lowerable to ground level by a cable and pulley system. The mounting and carrier have electrical terminal contacts which automatically disengage when the carrier is lowered and engage when it is raised to the locked position, and are arranged in two opposed arcuate series. The lock is such that it can be engaged and disengaged by successive pulls on the cable.

---

This invention relates to suspension gear for lanterns or chandeliers for electric lamps, and, in particular, such lanterns which are relatively heavy and are mounted at a considerable height above ground or floor level. One example of the use of such gear is for supporting a lantern on a standard high above road level. For convenience of description it will be assumed that the gear is for a lantern on a standard.

Such gear is well known and comprises, in general, an upper mounting secured to the lamp standard, and a lower carrier to which the lantern is attached. The carrier is secured to the mounting by a releasable lock and can be lowered to ground level with the lantern for cleaning or repair by a cable and pulley system of which the pulley is on the mounting, and the cable passes centrally through the mounting and carrier. The mounting and carrier have electrical terminal contacts which engage and disengage automatically when the carrier is raised and lowered into and out of its in use position. Such gear will be referred to hereafter as gear of the type aforesaid.

According to the present invention we provide suspension gear of the type aforesaid, in which said lock comprises, on the carrier, opposed pivotal arms each having a laterally projecting pin, and, on the mounting, opposed formations having guide faces adapted to guide the said pins automatically from the releasable position to the locked position and vice versa upon successive inwards movement of the carrier relative to the mounting, and said contacts are arranged on the carrier and on the mounting in two arcuate series opposed about the longitudinal axis of the carrier and the mounting.

Preferably, the contacts are carried by flanges on the carrier and mounting, and each flange has arcuate series of through-holes for the contacts, and each contact has an insulating bush formed in two shouldered parts fitted into a hole in the flange from opposite sides, the contact and said parts being clamped together by a screw-threaded bolt passing through said parts, and a nut.

Preferably also, the mounting carries an electric switch connected to a signal circuit and operable by the carrier when the latter is in its innermost position relative to the mounting, so that a signal may be given to indicate that the carrier should be lowered to effect locking of the carrier relative to the mounting.

Preferably also, the mounting has a skirt to which a cylindrical casing surrounding the carrier is detachably secured, the upper end of the casing having a resilient sealing strip around its periphery.

Preferably also, the carrier has secured thereto at its lower end a deeply dished plate having a plurality of holes in its side wall for the passage therethrough of electric conductors for the lantern lamp or lamps.

Preferably also, said dished plate has a peripheral flange on which is mounted an annular seal closing the lower end of said casing.

An embodiment of the invention will now be described, by way of example, with reference to the accompanying drawings, in which.

Figure 1:
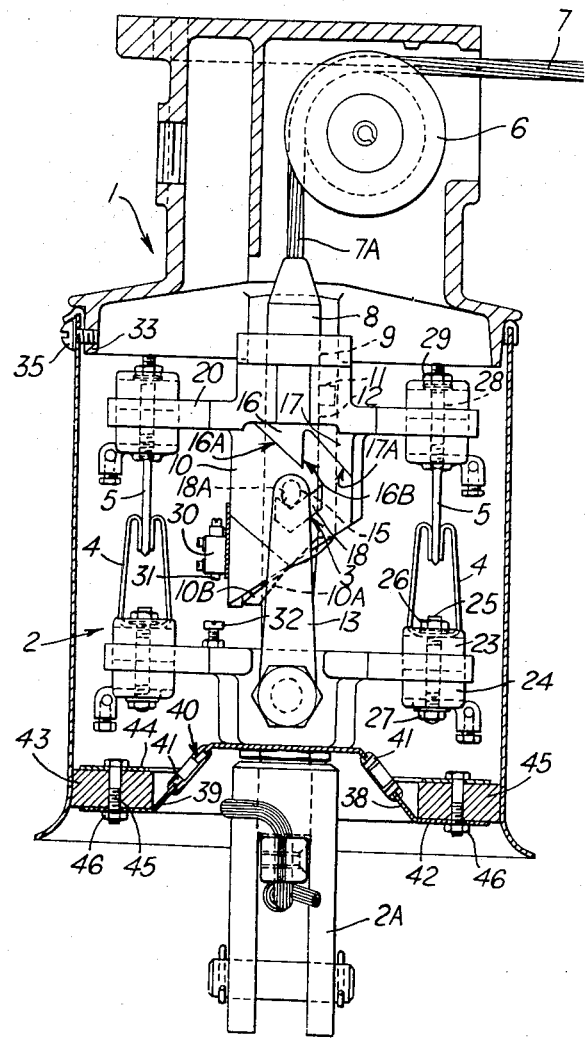
FIG. 1 is a part sectional side view of suspension gear according to the present invention, and showing the carrier locked to the mounting.

Referring to the drawings, suspension gear consists generally of a mounting 1 adapted to be bolted to a fixture, a carrier 2 screwed to the mounting 1 by a releasable lock 3 and having a shackle 2A for attaching a lantern, not shown, and contacts 4 on the carrier 2 releasably engaged with contacts 5 on the mounting 1. When the lock 3 is released, the carrier 2 can be lowered to ground level by a cable and pulley system of which the pulley 6 is carried by the mounting 1, and the cable 7 passes over the pulley 6, one end portion 7A of the cable passing through a central spigot 8 on the carrier 2 and being secured to the shackle 2A, and the other end portion being attached to a winch on the standard for the lantern. The spigot 8 projects through a central hole 9 in the body 10 of the mounting 1, and has a key 11 in a keyway 12 in the body 10 for preventing relative rotation between the carrier 2 and the mounting 1.

Figure 2:
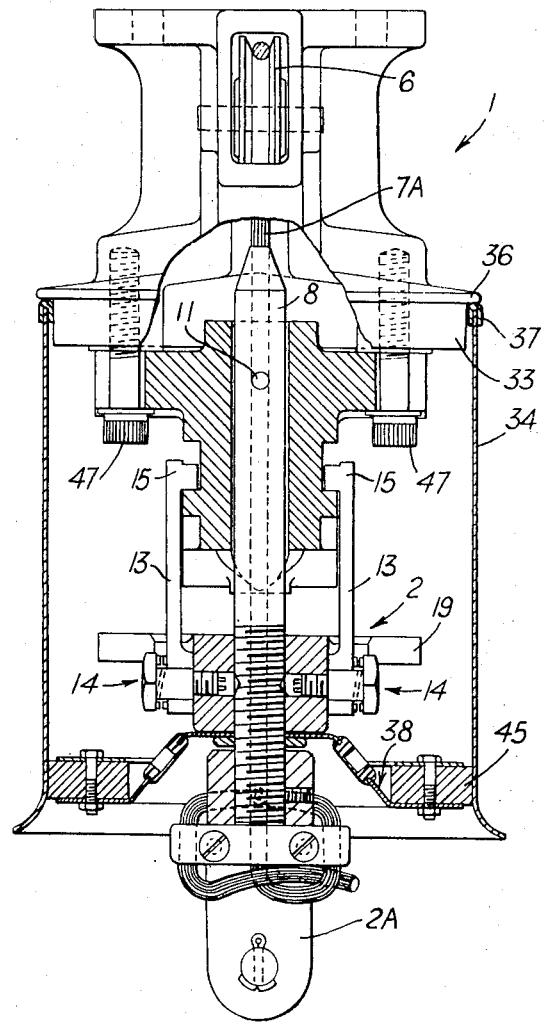
FIG. 2 is a sectional side view corresponding to FIG. 1 taken at right angles to the view in FIG. 1.

The lock 3 consists of opposed arms 13 pivotally mounted at 14 on the carrier 2 and having laterally inwardly projecting pins 15, and, on opposite sides of the body 10 of the mounting 1, an upper toothed rack having two teeth 16, 17, and a lower tooth-like formation 18 of substantially chevron shape of which the upper face 18A forms a pocket for the pin 15 in the locked position, as shown in FIGS. 1 and 2. The teeth 16, 17 and the formations 3 are so arranged, as shown, that when the carrier 2 is pulled upwards by the cable 7, the pins 15 strike and ride up the faces 16A of the teeth 16, and, when the cable is unwound to lower the carrier 2, the pins 15 move down clear of the formation 18, down a cam face 19 and clear of the body 10.

Figure 3:
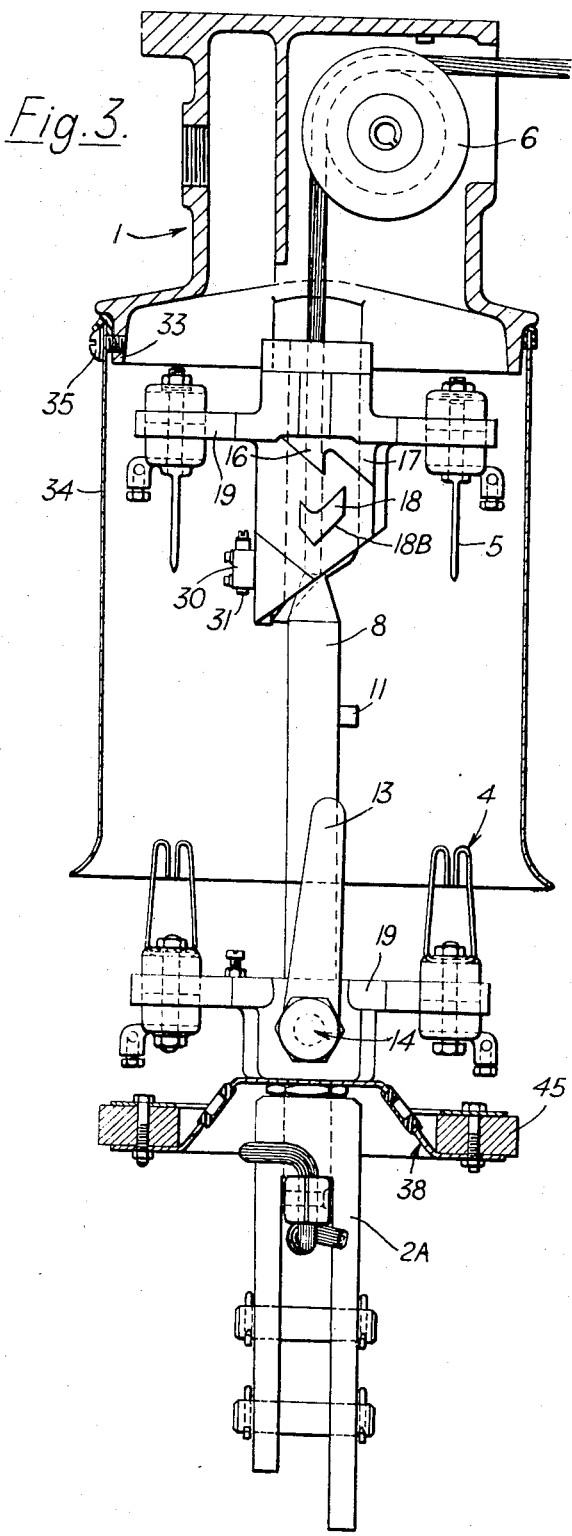
FIG. 3 is a view corresponding to FIG. 1 and showing lock released.
Figure 4:
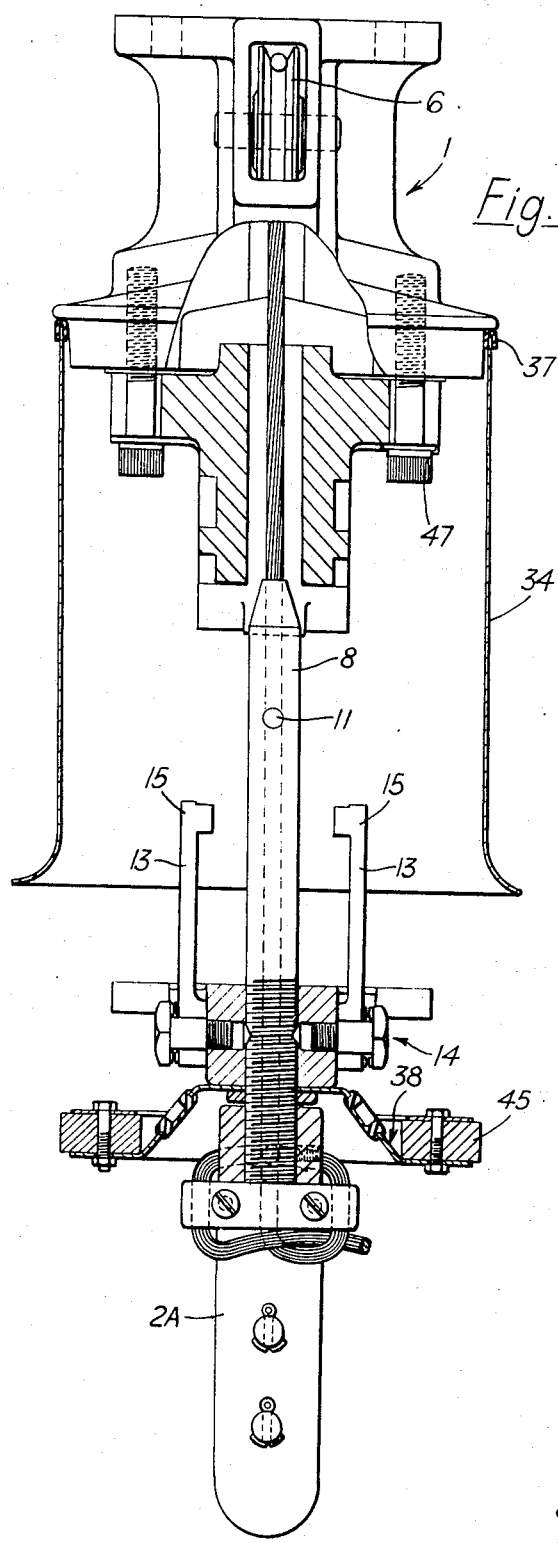
FIG. 4 is a view corresponding to FIG. 2 showing the lock released.

In FIGS. 3 and 4, the carrier 2 is shown after it has been lowered, in this way, relative to the mounting 1. When the carrier and mounting have to be locked together, the carrier is raised by the cable 7, the pins engage and ride up the lower faces 18B of the formation 18, strike and ride up the face 17A of the tooth 17, and then, when the cable is unwound to lower the carrier 2, the pins 15 ride down the vertical faces 16B of the teeth 16 and into the pocket formed by the upper face 18A of the formation 18, back to the position shown in FIGS. 1 and 2.

Figure 5:
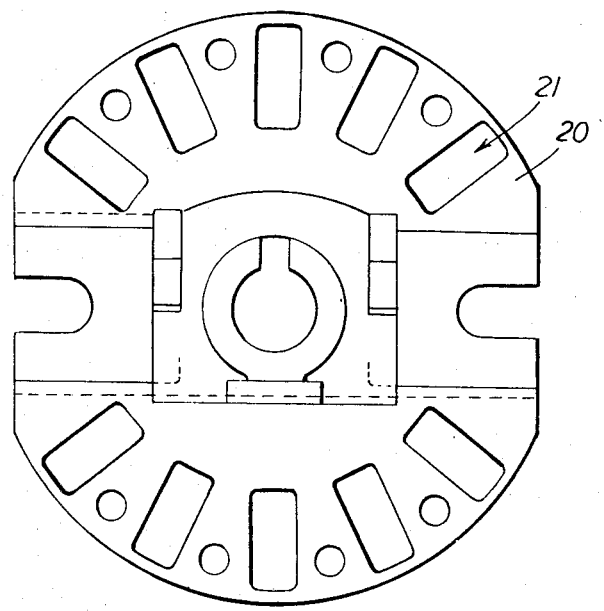
FIGS. 5 and 6 are plan views showing details.
Figure 6:
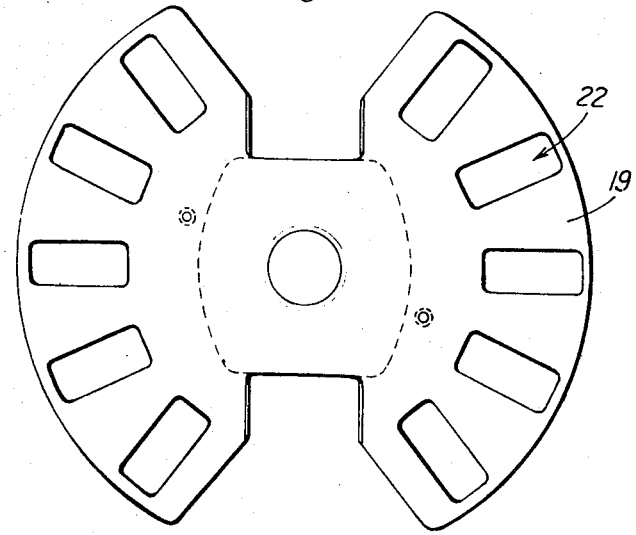

The contacts 4, 5 are arranged in each case in two arcuate series opposed about the longitudinal axis of the mounting 1 and carrier 2, and are carried respectively by flanges 19, 20 on the carrier 2 and the mounting 1, there being five contacts in each series. This arrangement is best shown with reference to FIGS. 5 and 6, which show plan views of the flanges 20, 19 respectively, the flanges 20, 19 having through holes 21, 22 respectively for the contacts 4, 5.

Each contact 4 has an insulating bush made of plastics and formed in two parts 23, 24 which are fitted into a hole 22 from opposite sides, and have shoulders which abut the upper and lower faces of the flanges 19, and the abutting inner end portions of the parts 23, 24 are stepped and overlapping. The contact 4 has a substantially U-shaped member, of which the legs are bent back towards each other at their face ends, and the base of the U and the parts 23, 24 are clamped together and to the flange 19 by a screw-threaded bolt 25 passing therethrough, and nuts 26, 27. The contacts 5 are similar to the contacts 4, except that each contact 5 has a single blade contact member, and the bolt 28 is screwed thereto, and there is only a single nut 29.

The body 10 of the mounting 1 has a micro switch 30, FIGS. 1 and 3, attached thereto with its operating plunger 31, projecting downwards, and the flange 19 of the carrier 2 has an adjustable set screw 32 directly below the plunger 31. The micro switch 30 is in circuit with a signalling device, not shown, for example an electric lamp. When the carrier 2 is being raised to its in-use position and when the pins 15 ride up the faces 17A, the set screw 12 abuts the plunger 31 and depresses it as the pins reach the ends of the faces 17A so that the signal lamp is lit and indicates to the winch operator that the winch should be reversed to lower the carrier 2 and engage the pins 15 in the pockets formed by the faces 18A. In a similar manner, the signal lamp is lit, when the carrier 2 is raised prior to lowering. Also, when the signal lamp is unlit, it gives an indication that the lock 3 is correctly engaged.

The mounting 1 has a skirt 33 to which the upper end of a cylindrical casing 34 is secured by screw-threaded bolts 35, the casing 34 extending beyond the lower end of the carrier 2. The skirt 33 has an upper peripheral bead or flange 36, and the upper end of the casing 34 has a resilient plastics sealing strip 37 abutting the flange 36.

At its lower end, the carrier 2 is closed by a deeply dished end plate 38 which has in its peripheral side wall 39 a plurality of holes 40 through which electrical conduits for the lamp or lamps of the lantern are passed. The holes 40 are shown closed by semi-blind insulating grommets or bushes 41 which are pierced before use. The wall 39 has an outwardly projecting peripheral flange 42 to which an annular felt seal 43 is screwed by an annular plate 44, bolts 45 and nuts 46, the seal 43 making sealing engagement with the casing 34.

The body 10 of the mounting 1 is made as a casting, and is secured to the upper part of the mounting by bolt 47.

For clarity, in FIGS. 1 and 3, only two contacts 4, 5 are shown, and none are shown in FIGS. 2 and 4.

The body 10 has at its lower end cam faces 10A, 10B and, when the carriage 2 is being raised to its in-use position, the key 11 on the spigot 8 rides up one of these cam faces and is automatically guided into the keyway 12.

The suspension gear described may be used to support weight up to 600 lbs., and two such suspension gears may be used in tandem to support weights up to 1200 lbs. In the latter case, the microswitches 30 are connected in the electric signalling circuit so that both plungers 31 must be depressed before the signalling device operates.

We claim:
1. In suspension gear for supporting a heavy electric lamp lantern at a considerable height above ground level on a standard and comprising an upper mounting for securing to the lamp standard, a lower carrier for attaching the lantern, a lock releasably securing the carrier to the mounting, a cable and pulley system for raising and lowering the carrier relative to the mounting and of which the pulley is on the mounting and the cable passes centrally through the mounting and the carrier and is connected to the latter, electrical terminal contacts on the mounting and carrier and engageable and disengageable automatically when the lock is engaged and released respectively, said lock comprising, on the carrier, opposed pivotal arms and a laterally projecting pin on each arm, and, on the mounting, opposed formations, guide faces on the latter for guiding the pins automatically from the release position to the locked position and vice versa upon successive inwards movement of the carrier relative to the mounting, and the contacts being arranged on the carrier and on the mounting in two arcuate series opposed about the longitudinal axis of the carrier and the mounting; the improvement in which the contacts are carried by flanges on the carrier and mounting, and each flange has arcuate series of through-holes for the contacts, and each contact has an insulating bush formed in two shouldered parts fitted into a hole in the flange from opposite sides, the contact and said parts being clamped together by a screw-threaded bolt passing through said parts, and a nut, the mounting carrying an electric switch for connection to a signal circuit and operable by the carrier when the latter is in its innermost position relative to the mounting, so that a signal may be given to indicate that the carrier should be lowered to effect locking of the carrier relative to the mounting, the mounting having a skirt to which a cylindrical casing surrounding the carrier is detachably secured, the upper end of the casing having a resilient sealing strip around its periphery, the carrier having secured thereto at its lower end a deeply dished plate having a plurality of holes in its side wall for the passage therethrough of electric conductors for the lantern lamp or lamps, said dished plate having a peripheral flange on which is mounted an annular seal closing the lower end of said casing.

References Cited

UNITED STATES PATENTS

| 444,330 | 1/1891 | Chase | 240—65 |
| 848,573 | 3/1907 | Smart | 240—66 |
| 1,552,654 | 9/1925 | Thompson | 240—66 |
| 3,359,412 | 12/1967 | Kepenach | 240—11.2 |

FOREIGN PATENTS

| 285,804 | 7/1915 | Germany. | |

JOHN M. HORAN, Primary Examiner

R. P. GREINER, Assistant Examiner

U.S. Cl. X.R.

240—63